United States Patent [19]

Lind

[11] B 4,010,421
[45] * Mar. 1, 1977

[54] SYNCHRONIZATION METHOD FOR THE RECOVERY OF BINARY SIGNALS

[75] Inventor: Kurt Bertil Reinhold Lind, Vastra Frolunda, Sweden

[73] Assignee: Telefonaktiebolaget L M Ericsson, Stockholm, Sweden

[*] Notice: The portion of the term of this patent subsequent to Sept. 24, 1991, has been disclaimed.

[22] Filed: June 11, 1974

[21] Appl. No.: 478,234

[44] Published under the second Trial Voluntary Protest Program on March 30, 1976 as document No. B 478,234.

Related U.S. Application Data

[62] Division of Ser. No. 308,810, Nov. 22, 1972, Pat. No. 3,838,214.

[30] Foreign Application Priority Data

Dec. 6, 1971 Sweden .......................... 15633/71

[52] U.S. Cl. .................. 325/38 A; 178/68; 178/69.1
[51] Int. Cl.² .................. H04L 7/02; H03K 13/24
[58] Field of Search ............... 325/38 A, 321, 419, 325/420; 178/68, 69.5 R; 179/15 BS

[56] References Cited

UNITED STATES PATENTS

| | | | |
|---|---|---|---|
| 3,303,284 | 2/1967 | Lender | 178/68 |
| 3,369,229 | 2/1968 | Dorros | 340/347 |
| 3,515,991 | 6/1970 | Lender | 325/38 |
| 3,601,702 | 8/1971 | Lender | 325/38 A |
| 3,654,492 | 4/1972 | Clark | 307/269 |
| 3,679,977 | 7/1972 | Howson | 325/42 |
| 3,707,683 | 12/1972 | Dotter, Jr. | 328/139 |
| 3,750,021 | 7/1973 | Lender | 325/38 A |
| 3,753,113 | 8/1973 | Maruta et al. | 325/38 A |
| 3,761,818 | 9/1973 | Tazaki et al. | 325/38 A |

Primary Examiner—Robert L. Griffin
Assistant Examiner—Marc E. Bookbinder
Attorney, Agent, or Firm—Hane, Baxley & Spiecens

[57] ABSTRACT

A synchronization method for the recovery, at the receiver side of an information transmission equipment, of bit timing information during the transmission of a binary signal which at the transmitter side of the equipment is converted into a multilever signal with correlative properties. From such multilevel signal, a binary signal conforming with the original binary signal is reconstructed at the receiver side. Bit timing information for sampling purposes at the receiver side is obtained by detection of the times at which the multilevel signal reaches and/or leaves at least one specific level.

6 Claims, 11 Drawing Figures

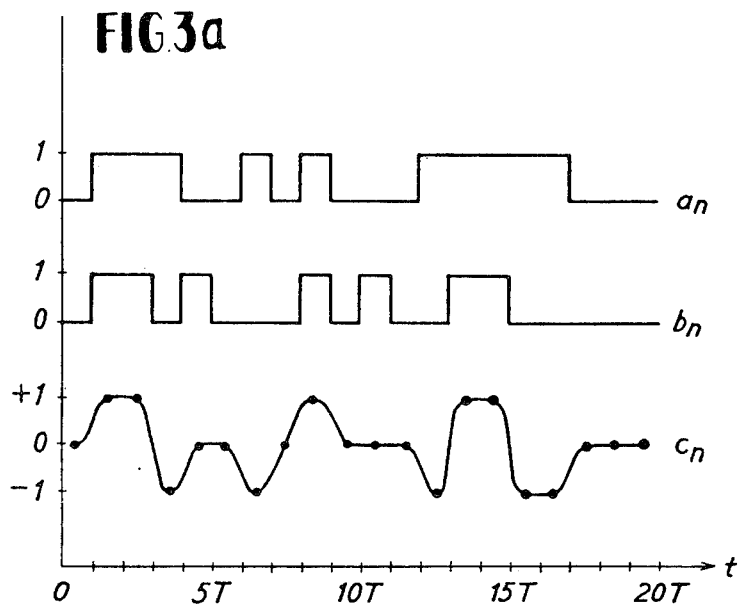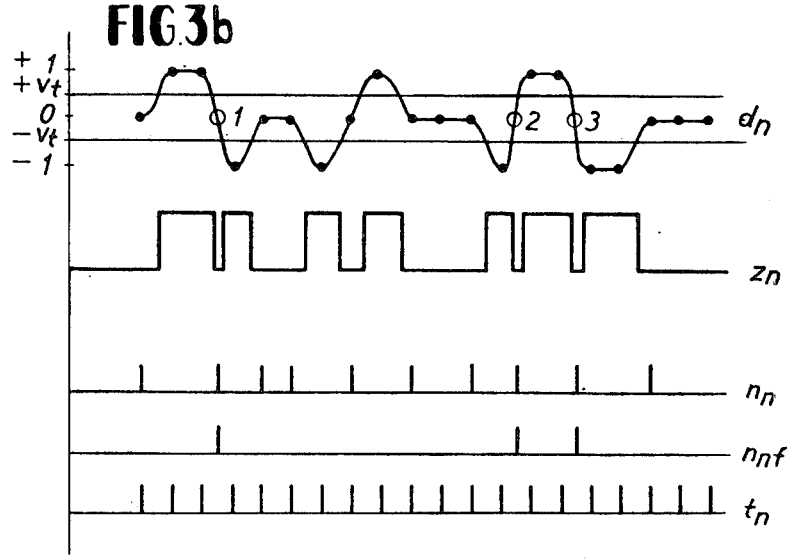

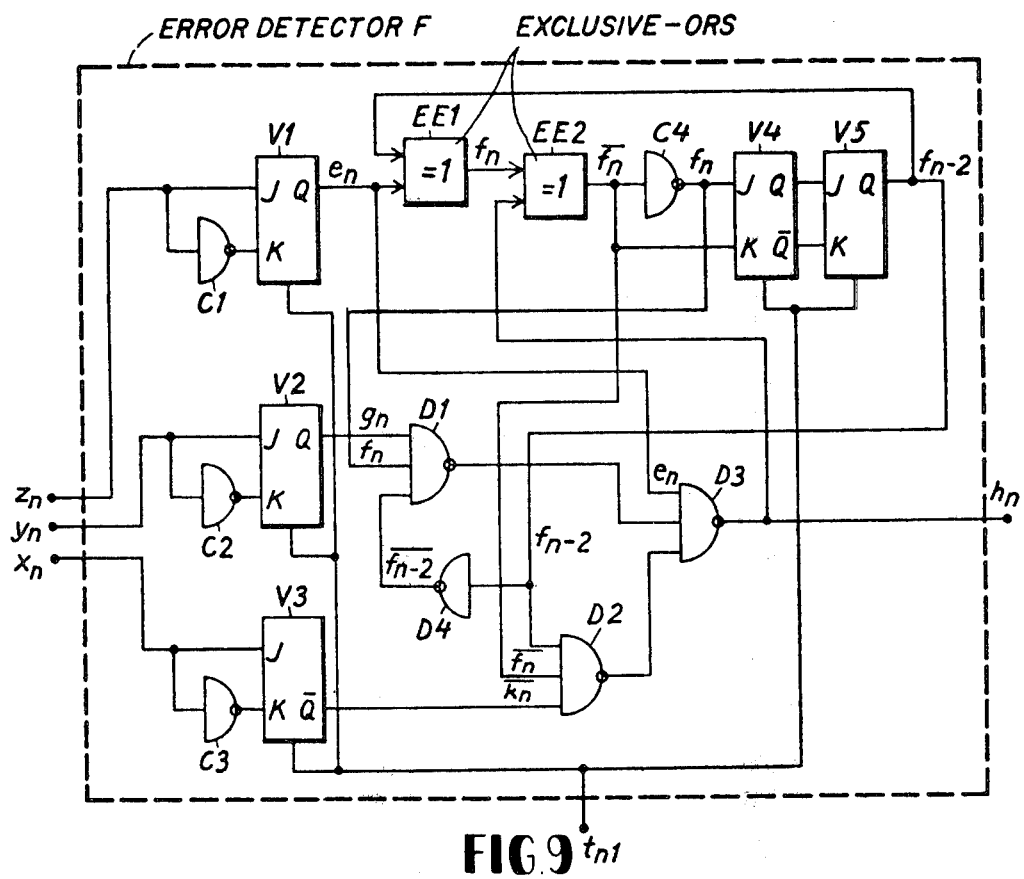
FIG. 9
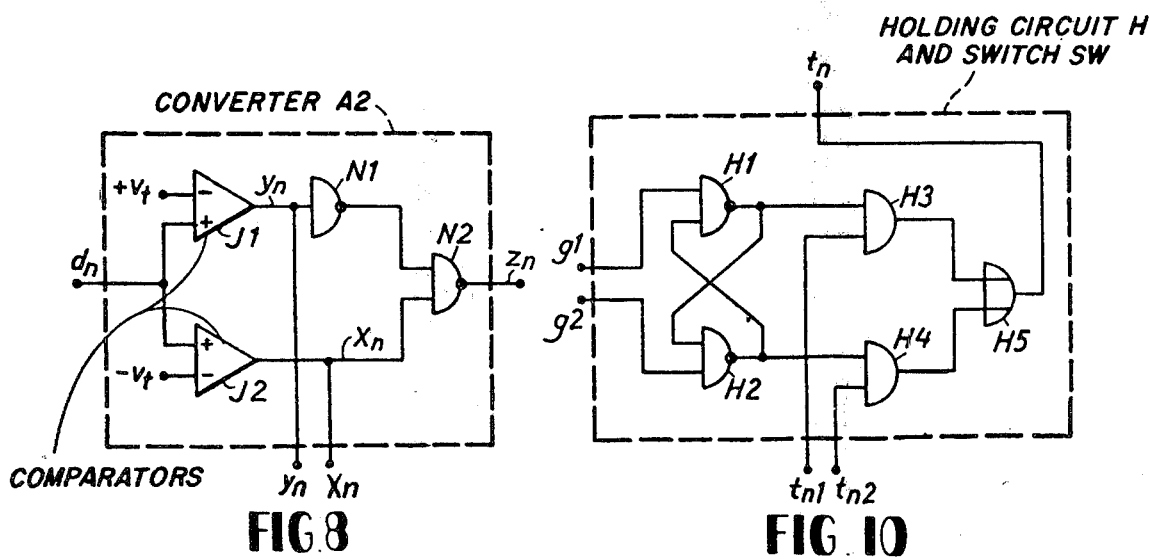
FIG. 8
FIG. 10

SYNCHRONIZATION METHOD FOR THE RECOVERY OF BINARY SIGNALS

This invention is a division of my application Ser. No. 308,810, filed Nov. 22, 1972, now U.S. Pat. No. 3,838,214.

The present invention relates to a synchronization method for recovery, at the receiver side, of bit timing information on transmission of a binary signal which at the transmitter side is converted into a multilevel signal with correlative properties. From the multilevel signal is recovered at the receiver side a binary signal conforming with the original binary signal, the bit timing information in the transmitted signal being utilized for bit timing regeneration through detection of the event that the signal reaches and/or leaves a level.

One of the advantages of introducing such conversion from a binary signal into a multilevel signal on the transmitter side of the information transmission equipment and back from a multilevel signal into a binary signal on the receiver side is a considerable reduction of the bandwidth requirement in the transmission medium in use for a given speed of transmission.

Synchronization methods and arrangements for recovery of bit timing information on the receiver side of an information transmission equipment on transmission of digital signals converted into multilevel signals through the use, for example, of detections of the fact that the transmitted signal reaches or leaves the zero level are already known. In the case of a first type of digital multilevel signals, in which the signal reaches or leaves the zero level at times separated by an integral multiple of the bit time period of the digital signal, the bit timing regeneration on the receiver side can take place unambiguously and relatively simply through the fact that, for example, an oscillator unit (clock signal generator) is adjusted to correct phase by means of the pulses from a zero level crossing detector. The pulses of the oscillator unit, the so-called clock signal, then control the signal processing logic. In the case of a second type of digital multilevel signals the detections take place at times separated by an integral multiple of half the bit timing period for the digital signal. Therefore, when using the known technique as described above for a random varying digital signal on the receiver input, there is equal probability of the so generated clock signals being for example, 180° out of phase relative to the incoming signal, and the bit timing regeneration is thus not unambiguous.

Multilevel signals of the first kind are, for example, so-called duobinary signals described by Adam Lender in IEE SPECTRUM, February 1966, page 104 et seq., while signals of the second kind are, for example, so-called modified duobinary signals described in the same article on page 113 et seq.

The present invention provides a solution of the problem of synchronization on the receiver side, especially in the case of transmission of a multilevel signal of the second kind referred to above. The correlative properties of this type of signal — i.e. that the signal amplitude at every time is dependent, among other factors, on one or more preceding values of the signal — is used for recovery of the bit timing information on the receiver side. The method according to the invention have the characteristics specified in the subsequent claims.

The invention will now be more fully described with the aid of an example with reference to the following drawings.

FIGS. 3a and 3b show signal wave-forms at some different points in the coder and decoder.

FIG. 8 shows the converter for conversion from three-level code into binary code according to the invention.

FIG. 9 shows an error detector according to the invention.

FIG. 10 shows a holding circuit with an electronic switch according to the second embodiment of the invention.

Figure 1:
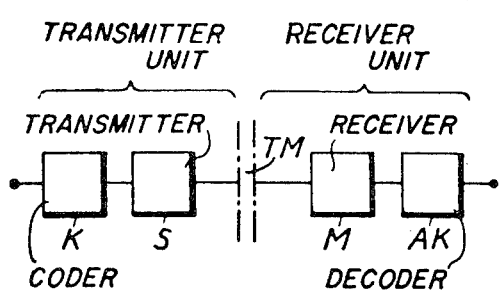
FIG. 1 shows a block schematic of an information transmission equipment with a transmitter and receiver unit in which an arrangement according to the invention is used.

FIG. 1 shows an information transmission equipment with a transmitter unit consisting of a coder K and the actual transmitter S, which is adapted to the transmission medium TM, e.g. wire or radio link. The receiver unit consists of the receiver M, which is also adapted to the transmission medium, and a decoder AK, of which the synchronization unit according to the invention forms part. The coder K converts the binary signal into a corresponding multilevel signal, the transmission of which requires a smaller bandwidth than the transmission of the original binary signal. The decoder AK in the receiver unit converts the received multilevel signal into a signal which corresponds to the original binary signal on the transmitter side.

Figure 2:
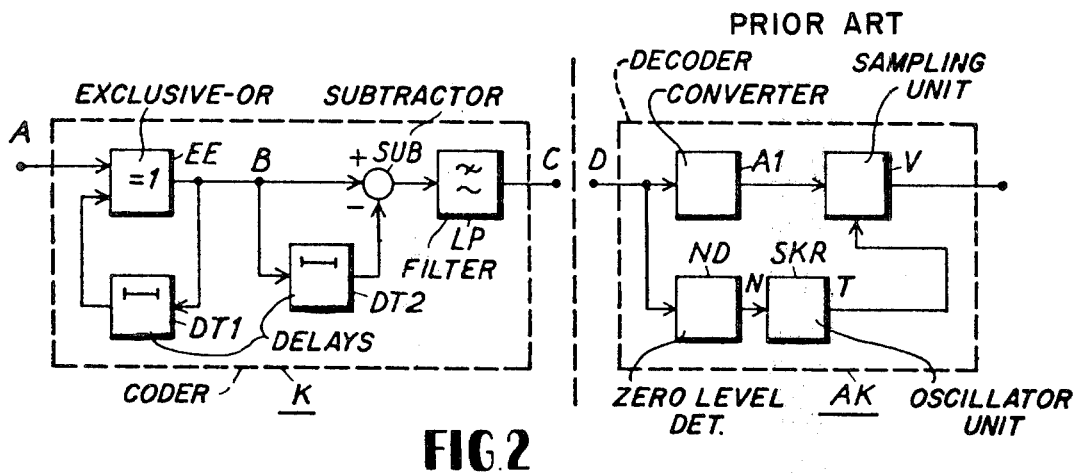
FIG. 2 shows the coder and decoder for the transmitter and receiver units, respectively, designed in accordance with a known technique, in the form of block schematics.

FIG. 2 shows a coder K, according to known technique, for conversion of a binary signal into a three-level signal which, via a transmission path, e.g. wire, is transmitted to a decoder AK in which the three-level signal is converted into a counterpart of the original binary signal. On the input A of the coder K an information signal arrives in the form of a binary pulse train $a_n$ ( cf. FIG. 3a). By carrying out an EXCLUSIVE-OR-operation in the EXCLUSIVE-OR-gate EE between pulse train $a_n$ and the output signal $b_n$ from the gate EE, delayed two pulse periods in the delay circuit DT1, there is obtained at point B a second binary pulse train $b_n$ ( cf. FIG. 3a). From the values of the binary pulse train $b_n$ at equidistant points of time $t_n$ the value delayed two pulse periods in the delay circuit DT2 of the same pulse train is subtracted in the arthmetical subtractor SUB. Through this operation a three-level signal is obtained which is lowpass-filtered in the filter LP, on the output C of which the signal $c_n$ is obtained ( cf. FIG. 3a). The resulting signal $c_n$ can thus assume values −1, 0 and +1. In contradistinction to conventional multilevel signals, which are characterized by the lack of correlation between the levels, the signal $c_n$ described above has correlative properties, i.e. the value at a given point of time is dependent on the preceding values of the signal. Furthermore each level in the described correlative code represents only one binary digit, 1 or 0. On the receiver side, owing to the built-in rules in the code, the signal can be decoded bit by bit, i.e., each sampled value of the received signal provides an unambiguously corresponding value of the original binary signal without needing to take into account the preceding values of the latter signal. From FIG. 3a is seen the simple relation between the original signal $a_n$ and the three-level signal $c_n$, which in this case consists in the fact that a one in the signal $a_n$ corresponds to $+1$ or $-1$ in signal $c_n$ and that zeroes correspond to one another unambiguously in the two signals. The decoder AK in the receiver unit (cf. FIG. 2) receives on its input D a delayed image $d_n$ of the signal $c_n$ delivered from the transmitter side (cf. FIG. 3b). The converter A1 converts the three-level signal $d_n$ into a binary signal which, on correct transmission and interpretation in the receiver, constitutes an incompletely converted counterpart of the original information-carrying signal $a_n$ on the transmitter side. In the sampling circuit V the signal is than detected on the occurrence of every clock signal pulse, so obtaining a slightly delayed counterpart of the original signal $a_n$. A zero level detector ND is arranged to detect the times when the incoming signal $d_n$ reaches or leaves the zero level and, on its output N, delivers a signal $n_n$ consisting of pulses marking the aforesaid events (cf. FIG. 3b). The expressions reaches and leaves used in the specification and in the claims comprise also a passage through the specific level, in this case the zero level, during which the signal reaches and leaves the level at the point of time. The said pulses control the phase position of an oscillator unit SKR, which generates a clock signal at its output T, whose frequency is identical with the bit timing frequency of the original signal $a_n$ on the transmitter side. From FIGS. 3a and 3b, furthermore, it is apparent that the events detected as above for the incoming signal $d_n$, which are numbered 1-2-3, occur at times separated by an integral multiple of half the bit timing period for the original signal. These detections may cause incorrect phase locking of the oscillator unit SKR. The points on the curves representing the signals $c_n$ in FIG. 3a and $d_n$ in FIG. 3b show the correct sampling times. These are also represented in the form of a clock signal $t_n$ in FIG. 3b. The signal $n_{nf}$ in the FIGS. 3b marks the occurrence of events of the aforementioned kind in an incorrect phase. On incorrect phase locking a clock signal is formed with the same frequency as the clock signal $t_n$ shown in FIG. 3b, but phase-shifted half a cycle. Note that sampling at times determined by such an incorrect clock signal, would result in a reconstructed binary signal which does not correspond to the original binary signal.

Figure 4:
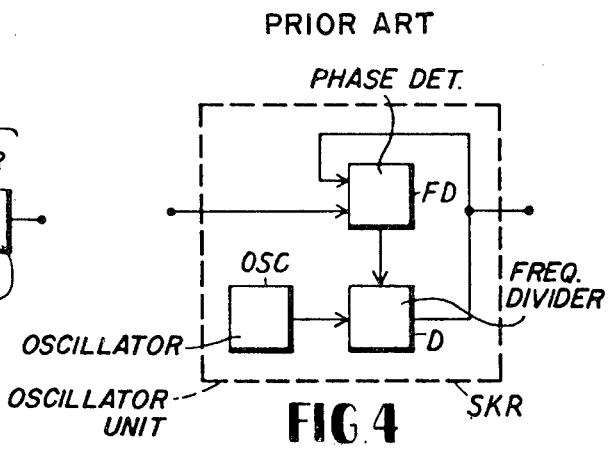
FIG. 4 shows the oscillator unit in the decoder in block schematic form designed in accordance with known technique.

FIG. 4 shows a block schematic of the oscillator unit SKR in the decoder AK designed according to known technique. The oscillator OSC generates a frequency 128 times the clock signal frequency, or bit frequency at the transmitter side, which is then divided in the variable frequency divider D by a factor $128\pm2$. The output signal from the local oscillator SKR is compared with respect to phase with the bit timing information from the zero level detector ND in the phase detector FD, whereupon the output signal from the phase detector FD controls the variable frequency divider D in such a manner that any phase difference between the two compared signals is diminished.

Figure 5:
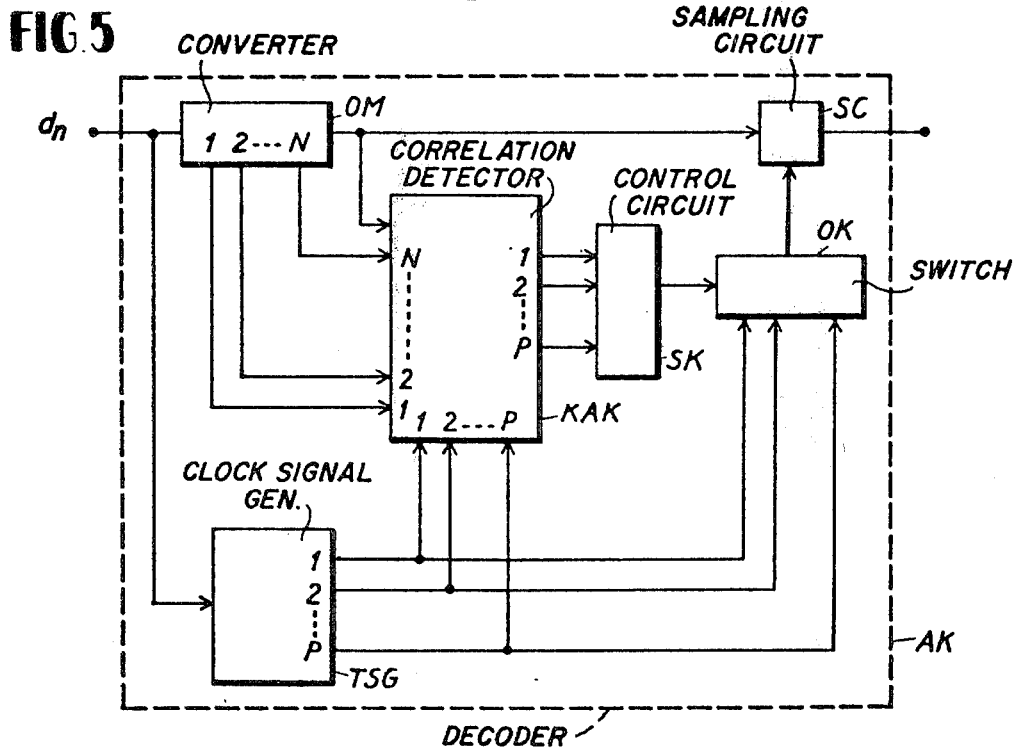
FIG. 5 shows a general block schematic of a decoder for a multilevel signal.

FIG. 5 shows the principle for a decoder AK with the aid of which the correlative properties of a multilevel signal can be used to eliminate the effect of the earlier mentioned detections of events in incorrect phase position on detection of the received and converted signal in the sampling circuit SC. The converter OM, like the earlier described converter A1, delivers on one of its outputs a binary signal which constitutes an incompletely converted counterpart of the original binary signal on the transmitter side. On a number N of other outputs, the converter delivers other binary signals which, through a specific combination of their simultaneous values, unambiguously indicate the present level of the multilevel signal on the input to the converter. The received multilevel signal is also fed to the input of a clock signal generator TSG which, from the received signal, forms a number P of clock signals, all with the same frequency but with different phase positions. The various phase positions of the clock signals are determined by the occurrence of the event that the multilevel signal reaches or leaves one or more specific levels. All outputs, both from the converter OM and from the clock signal generator TSG, are connected to a correlation detector KAK which, at times determined by the various clock signals, tests whether the relation, determined by the correlative properties of the multilevel signal, between the value of the original binary signal corresponding to the value of the multilevel signal and a specific combination of preceding values of the multilevel signal is fulfilled. The result of the various tests is presented on a number P of outputs of the correlation detector, each of which is allotted a specific clock signal. These output signals are fed to a control circuit SK which, from the information contained in the output signals, determines which of the clock signals causes the lowest number of indicated deviations from the relation and is thus in correct phase. The control circuit controls with its output signal a subsequent switch OK which later connects the clock signal with correct phase to the sampling circuit SC.

Figure 6:
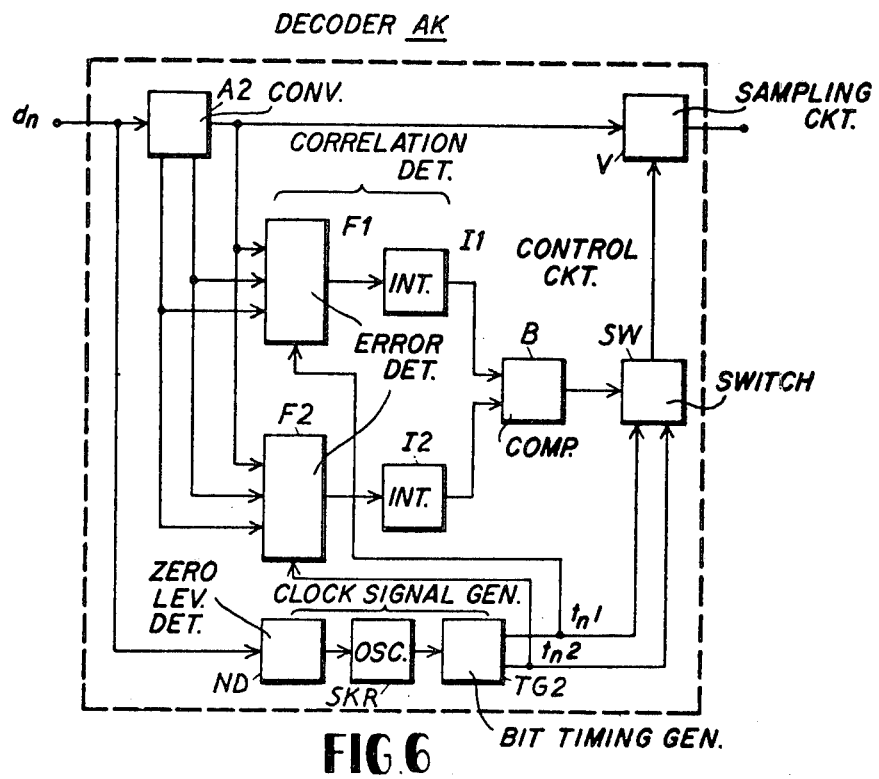
FIG. 6 shows a block schematic of one embodiment of the invention intended for a three-level signal.

FIG. 6 shows a decoder AK designed according to the principle of the invention and adapted to a three-level signal of modified duobinary type. The converter A2 delivers three binary output signals, of which one constitutes the incompletely converted counterpart of the original binary signal on the transmitter side and the other two contain information concerning the simultaneous value of the three-level signal on the input to the converter. The clock signal generator TSG of FIG. 5 as part of named in the description of the general principle of the invention is made up of three cascade-connected units, a zero level detector ND, an oscillator unit SKR and a bit timing generator TG2. The bit timing generator TG2 generates one sequence of clock signals $tn1$ which are transmitted on line $tn1$, and generates another sequence of clock signals $tn2$ which are transmitted on line $tn2$. Of the two generated sequences of clock signals one is formed in the earlier described manner by the zero level detector ND and the oscillator unit SKR, whereupon the oscillator unit SKR phase-locks its output signal in one of the two possible phase positions, i.e. the output signal from the oscillator unit SKR is either in correct sampling phase or is displaced 180° in phase from it. The second output signal from the bit timing generator TG2 constitutes a 180° out-of-phase counterpart of the first. It is, however, impossible to foresee which of the clock signals will be in correct phase. The earlier named correlation detector of FIG. 5 consists, in this embodiment of the invention, of error detectors F1 and F2 of identical design and working in parallel, the operation of which is controlled by their respective clock signals generated by the bit timing generator TG2. One error detector will thus work in correct and the other in incorrect phase.

A detected error in one of the error detectors would be indicated on the binary output of the corresponding error detector as a zero, as will be more manifestly apparent in conjunction with the description of FIG. 9. The indicated error frequency, i.e. the number of zeroes in relation to the number of ones on the output of each error detector, is dependent on the phase position of the associated clock signal relative to the correct sampling phase in such a manner that a small error frequency is recorded for correct phase of the clock signal and a larger error frequency when the clock signal is displaced 180° in phase from that position. The outputs of the error detectors are connected to integrators I1 and I2 which, during a suitably chosen time, for example of the order of 1000 pulse periods, integrate the output signals from the respective error detectors. The output signals from the two integrators are then of considerably deviating order of magnitude at an acceptable signal-to-noise ratio. The outputs of the two integrators are connected to a comparator circuit B which controls a conventional electronic switch SW in such a way that the correct clock signal is connected to the sampling circuit V.

Figure 7:
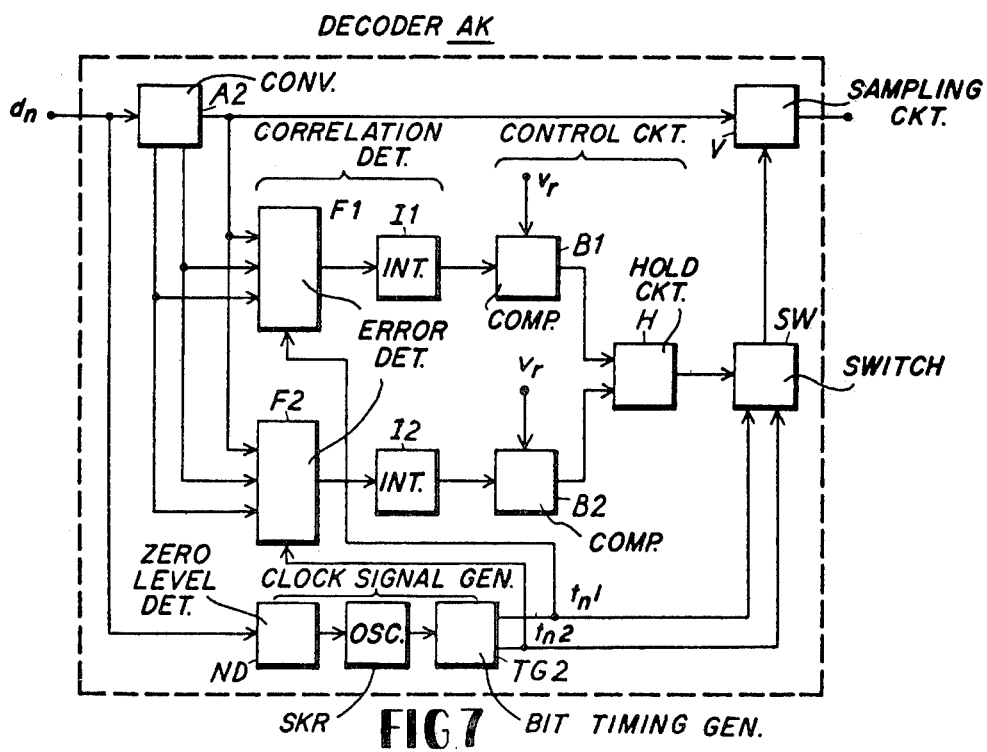
FIG. 7 shows a block schematic of a second embodiment of the invention intended for a three-level signal.

FIG. 7 shows another embodiment of the invention in which the comparator circuit B according to the first embodiment has been replaced by two comparator circuits B1 and B2 and a holding circuit H in order to permit satisfactory function also during a temporary deterioration of the signal-to-noise ratio for the received signal. This is because the first embodiment (cf. FIG. 6) has the disadvantage that, if a serious temporary deterioration of the signal-to-noise ratio occurs, causing uncertainty in the interpretation of the levels of the received signals, the two detected error frequencies may be of roughly the same magnitude, which may cause the comparator circuit B to change state on its output, so connecting an incorrect clock signal via the switch SW to the sampling circuit V. If the error frequency is 0 percent in "correct" time position, it is roughly 15 percent in "incorrect" time position. These values apply under condition of essentially equal distribution between the numbers of zeroes and ones in the received, regenerated signal. In the other embodiment a comparison is not made between the two signals representing the two detected error frequencies, but a separate comparison is made with a constant reference voltage $v_r$ corresponding to an error frequency, e.g. 5 percent. The output signal from the respective comparator circuit indicates by 0 the correct time position if the input signal to the comparative circuit corresponds to an error frequency of below 5 percent. Otherwise it indicates by 1 an incorrect time position. During transmission with an error frequency of below 5 percent this results in receipt of the output signals 0-1 or 1-0 from the comparator circuits.

The function of the holding circuit H is such that, when the output signal combination 1-1 from the two comparative circuits B1 and B2 exists, the previous state on the output of the holding circuit H is retained, i.e. incorrect switching of a clock signal to the sampling circuit V is avoided.

FIG. 8 shows the converter A2 forming part of the decoder AK, as shown in FIGS. 6 and 7, for conversion of three-level code into binary code. Incoming analogue three-level signals $d_n$ (cf. FIG. 3b) are connected to two comparator circuits J1 and J2 in which the signal level is compared with each of two fixed reference voltages $+v_t$ and $-v_t$ respectively, for which the rule is that $/v_t/$ lies roughly centrally between the signal levels corresponding to state zero and state one of the input signal $d_n$. The output signals $y_n$ and $x_n$ from the comparator circuits are binary digital signals. With the aid of NAND gates, N1 and N2, the output signal $z_n$ is then formed, which is also of binary digital type. The following table shows the possible combinations:

| $d_n$ | $x_n$ | $y_n$ | $z_n$ |
|---|---|---|---|
| +1 | 1 | 1 | 1 |
| 0 | 1 | 0 | 0 |
| −1 | 0 | 0 | 1 |

During faultfree transmission, accordingly, the signal $z_n$ constitutes an incompletely converted counterpart of the original signal $a_n$ on the transmitter side (cf. FIG. 3b).

In the table above, the values of $x_n$, $y_n$ and $z_n$ are shown for the values +1, 0 and −1 of $d_n$. The transition between the various states for the output signals takes place at times between the marked sampling times, specifically at the time of passage of the signal through the detecting levels $\pm v_t$ ( cf. FIG. 3b). From FIG. 3b is seen how sampling of the signal $z_n$ in synchronism with the clock signal $t_n$ produces a signal which corresponds to signal $a_n$ in FIG. 3a, while sampling of the signal $z_n$ in the alternative incorrect phase, i.e. the phase determined by the signal $n_{nf}$ in FIG. 3b, does not recreate the signal $a_n$, since the states of the signal $z_n$ caused by detection of the zero passage in the incorrect phase will be interpreted as zeroes.

FIG. 9 shows an embodiment of the error detector, two identical models of which are included in the described arrangement according to the invention (cf. FIGS. 6 and 7). The input signals $x_n$, $y_n$ and $z_n$, as already mentioned, are all binary signals. The JK flip-flop V1 and the NAND gate C1 together form a unit the function of which is identical with that of the sampling circuit V in FIG. 6, i.e. during faultfree transmission the signal $e_n$ shall be a counterpart of the original signal $a_n$ on the transmitter side. To investigate whether this is so, i.e. to detect errors which may arise during the transmission, the same operation on the signal $e_n$ is performed with the aid of the EXCLUSIVE-OR-gate EE1, the NAND gate C4 and the JK flip-flops V4 and V5 as was performed on the transmitter side on the signal $a_n$ in order to form a second binary pulse train, which in the error detector is denoted $f_n$. The function of the EXCLUSIVE-OR-gate EE2 will be described below. During faultfree transmission, accordingly, the pulse train $f_n$ in the error detector should be identical with the pulse train $b_n$ on the transmitter side. The pulse train $b_n$ is in turn related to the signal $c_n$ according to given rules, i.e., $C_n = b_n - b_{n-2}$. During faultfree transmission, furthermore, the signal $d_n$ on the receiver side should be a time-delayed counterpart of the signal $c_n$ on the transmitter side, and thus the values of the signals $f_n$ and $d_n$ at every point of time $t_n$ should be in a given relation, i.e., $d_n = f_n - f_{n-2}$ to one another.

In order, by means of binary arithmetic, to perform the error detection, which according to the above has been converted into an investigation whether a given value of the signal $d_n$ fulfills the above given relations of the signals $f_n$ and $f_{n-2}$, the information concerning the signal amplitude for the three-level signal $d_n$ must be coded in binary form. This is done by the converter A2 in FIG. 8, the binary output signals $x_n$ and $y_n$ of which contain precisely this information. Furthermore the two latter signals are synchronized with the aid of the JK flip-flop V3 and gate C3 in the case of one signal, and the JK flip-flop V2 and NAND gate C2 in the case of the other, so that a correct time position relative to the signals $e_n$, and the signal $f_n$ deriving from this signal, is obtained. The actual investigation whether such rules, i.e., $$e_n \cdot g_n \cdot f_n \cdot f_{n-2} \cdot f_n \cdot k_n = 1$$

are fulfilled is performed by the NAND gates D1, D2, D3 and D4 in such a way that the signal $h_n$ on the output of NAND gate D3 assumes state 1 when the rules are fulfilled, i.e. when a great probability exists that the transmission is correct. Otherwise the signal $h_n$ assumes state 0. The table shows the possible states, the signals $g_n$ and $k_n$ being synchronized counterparts of the signals $y_n$ and $x_n$.

| $e_n$ $(z_n)$ | $k_n$ $(x_n)$ | $g_n$ $(y_n)$ | $f_n$ | $f_{n-2}$ | $h_n$ |
|---|---|---|---|---|---|
| 1 | 1 | 1 | 1 | 1 | 0 |
|   |   |   |   | 0 | 1 |
|   |   |   | 0 | 1 | 0 |
|   |   |   |   | 0 | 0 |
|   | 0 | 0 | 1 | 1 | 0 |
|   |   |   |   | 0 | 0 |
|   |   |   | 0 | 1 | 1 |
|   |   |   |   | 0 | 0 |
| 0 | 1 | 0 | 1 | 1 | 1 |
|   |   |   |   | 0 | 1 |
|   |   |   | 0 | 1 | 1 |
|   |   |   |   | 0 | 1 |

The EXCLUSIVE-OR-gate EE2 serves as a condition-controlled converter in the manner that, when an error in the transmission is indicated, i.e. when the signal $h_n$ assumes the value 0, the inversion of the signal $f_n$ between the EXCLUSIVE-OR-gate EE1 and the gate C4 is annulled, so annulling residual effects of an indicated error. The signal $t_{n1}$ is one of the two clock signals generated by the bit timing generator TG2 ( cf. FIGS. 6 and 7).

FIG. 10 shows a holding circuit together with an electronic switch according to the second embodiment of the invention (cf. FIG. 7). According to the earlier description of FIG. 7 it is apparent that, if the clock signal $t_{n1}$ is the one of the two clock signals which are in correct phase, the output signal $g1$ from the comparator circuit B1 will be equal to zero, and the output signal $g1$ from the comparator circuit B2 will at the same time be equal to one, provided that there is at the moment a satisfactory signal-to-noise ratio. The output signal from the NAND gate H1 is then equal to one and the clock signal $t_{n1}$ passes through the AND gate H3 and OR-gate H5, whereupon the clock signal $t_n$ to the sampling circuit V will be equal to the clock signal $t_{n1}$. Owing to the fact that the output signal from the NAND gate H2 is at the same time a zero, the clock signal $t_{n2}$ is blocked in the AND gate H4. If a temporary deterioration of the signal-to-noise ratio for the circuit in accordance with the description of FIG. 7 causes the input signals $g1$ and $g2$ to the holding circuit H to be both equal to one, it is seen that the state of the outputs of the NAND gates H1 and H2 remains unchanged, i.e. the clock signal to the sampling circuit V which existed before the deterioration in the transmission occurred is retained.

Owing to the fact that, in the incoming multilevel signal, overshoots and undershoots generally occur at its changes of level, and that, in practice too, noise is generally superimposed on the signal, the bit timing information can be obtained, for example, by detection solely of the passages of the signal through the specified level. If, however, after reaching steady state at such level, the signal is in the vicinity of this level, only the first level crossing will carry useful bit timing information and the many other passages resulting from noise will constitute disturbances. The detection of the latter, however, can be inhibited by detection of the fact that the multilevel signal leaves the $+1$ or $-1$ level and detection solely of the first level crossing after it. The invention is not limited to the above described embodiments but several modifications are conceivable within the scope of the following claims.

What is claimed is:

1. In an information transmission system having a transmitter side wherein a first binary signal representing information bits is converted to a multilevel signal representing the same information bits such that the instantaneous level of the multilevel signal is correlated to the first binary signal and a receiver side wherein the multilevel signal is converted to a received binary-signal conforming with the first binary signal, a method for recovering, at the receiver side, bit timing information during the transmission of signals in the system comprising the steps of:
   a. forming a plurality of series of clock signals by the detection of the instants at which the multilevel signal attains and/or leaves at least one specific signal level, each of said clock signals being phase locked to the received multilevel signal at a different one of a plurality of alternative relative phase positions with respect to the multilevel signal but with only one of such positions being correct;
   b. converting the multilevel signal to a plurality of intermediate binary signals;
   c. generating from the intermediate binary signals pluralities of further binary signals logically related to the levels of the multilevel signal, each of the pluralities being generated at times determined by different ones of the series of clock signals;
   d. temporarily storing the pluralities of further binary signals whereby, at later times, signals related to certain levels of the multilevel signal are available;
   e. correlating to deterime at times established by each of the series of clock signals whether a particular relationship exists between the intermediate binary signals and a specific combination of preceding values of the multilevel signal as represented by each of the pluralities of further binary signals associated with each of the series of clock signals respectively, said particular relationship being determined by the correlation between the multilevel signal and the first binary signal at the transmitter side; and
   f. selecting one of the series of clock signals for establishing the bit timing relationship on the receiver side because of the correctness of its phase relation with respect to the information bits of the multilevel signal, said one of the series of clock signals being that which results, over a period of time, in the greatest number of agreements with respect to said particular relationship between said specific combination and the intermediate signals.

2. The method of claim 1 wherein the converting step comprises the steps of converting the received multilevel signal into a first intermediate binary signal which constitutes an incompletely converted counterpart of the first binary signal at the transmitter side and forming second intermediate binary signals in sufficient number that a specific combination of the second intermediate binary signals unambiguously indicates the instantaneous value of the received multilevel signal and said correlating step comprises for each of the clock signals logically testing at periodically selected times determined by the associated clock signal to determine whether said particular relationship exists between the signals expressed by said intermediate binary signals, recording for each of the clock signals the number of times said particular relationship exists to indicate how the phase position of each clock signal deviates from said correct phase position.

3. The method of claim 2 wherein the recording step comprises generating and storing a voltage level related to said number of times.

4. The method of claim 3 wherein said selecting step is performed by comparing the stored voltage levels.

5. The method of claim 3 wherein said selecting step is performed by comparing each voltage level with a predetermined voltage level so as to take into account signal transmission with a given signal-to-noise ratio.

6. The method of claim 1 wherein at the transmitter side the first binary signal having signal elements 1 and 0 is converted to a modified duo-binary signal having signal elements +1, 0, and −1 and wherein said correlating step comprises the steps of, for each of the alternative relative phase positions of the different clock signals, determining whether each 1 signal element in the first binary signal corresponds to either a +1 or a −1 signal element in the duo-binary signal, and determining whether each odd 1 signal element, counted from the start of the first binary signal, has reversed polarity in relation to the next preceding 1 signal element in the duo-binary signal, and each even 1 signal, counted from the start of the first binary signal, has the same polarity in the duo-binary signal, if, and only if the number of intermediate 0 is even.

* * * * *